(12) United States Patent
Chen et al.

(10) Patent No.: US 11,379,012 B2
(45) Date of Patent: Jul. 5, 2022

(54) HINGE ASSEMBLIES

(71) Applicant: HEWLETT-PACKARD DEVELOPMENT COMPANY, L.P., Spring, TX (US)

(72) Inventors: Wei-Chung Chen, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,854

(22) PCT Filed: Feb. 8, 2018

(86) PCT No.: PCT/US2018/017390
§ 371 (c)(1),
(2) Date: Jul. 30, 2019

(87) PCT Pub. No.: WO2019/156671
PCT Pub. Date: Aug. 15, 2019

(65) Prior Publication Data
US 2021/0325935 A1   Oct. 21, 2021

(51) Int. Cl.
G06F 1/16   (2006.01)
F16C 11/04   (2006.01)
E05D 11/08   (2006.01)

(52) U.S. Cl.
CPC ............ *G06F 1/1681* (2013.01); *F16C 11/04* (2013.01); *E05D 11/081* (2013.01); *E05Y 2201/21* (2013.01); *E05Y 2201/234* (2013.01); *E05Y 2201/236* (2013.01); *E05Y 2900/606* (2013.01)

(58) Field of Classification Search
CPC ...... G06F 1/1681; F16C 11/04; E05D 11/081; E05Y 2201/21; E05Y 2201/234; E05Y 2201/236; E05Y 2900/606
See application file for complete search history.

(56) References Cited

U.S. PATENT DOCUMENTS

| 5,419,013 A | * | 5/1995 | Hsiao | A47K 13/12 16/319 |
| 5,771,540 A | | 6/1998 | Carpenter et al. | |
| 5,794,277 A | * | 8/1998 | Jones | A47K 13/12 4/236 |
| 7,055,217 B2 | | 6/2006 | Nishihara | |

(Continued)

FOREIGN PATENT DOCUMENTS

| CN | 206594576 U | 10/2017 |
| DE | 102012108625 A1 | 3/2014 |
| KR | 100651333 B1 | 11/2006 |

*Primary Examiner* — Victor D Batson
*Assistant Examiner* — Matthew J Sullivan
(74) *Attorney, Agent, or Firm* — Lakshmi Kumaran & Sridharan

(57) ABSTRACT

In an example, a device includes a base unit, a cover unit, and a hinge assembly to couple the cover unit to the base unit The hinge assembly is moveable between a folded position and an unfolded position. The hinge assembly includes a channel, an annular holder disposed in the channel, a shaft engaged with the annular holder, and a hydraulic cylinder coupled to the shaft. The hydraulic cylinder is to move the shaft along a longitudinal axis of the shaft, based on a movement of the hinge assembly between the folded position and the unfolded position, to vary an operating torque of the hinge assembly.

15 Claims, 4 Drawing Sheets

(56) References Cited

U.S. PATENT DOCUMENTS

| | | |
|---|---|---|
| 7,277,275 B2 | 10/2007 | Won et al. |
| 9,957,743 B2 * | 5/2018 | Chen .................. E05F 3/04 |
| 2005/0015156 A1 | 1/2005 | Hikichi |
| 2006/0272129 A1 | 12/2006 | Rude et al. |
| 2008/0010776 A1 | 1/2008 | Kaneko et al. |
| 2011/0317338 A1 | 12/2011 | Chen et al. |
| 2017/0292302 A1 | 10/2017 | Tomky |

* cited by examiner

HINGE ASSEMBLIES

BACKGROUND

Devices, such as laptops, may be manufactured to be compact and portable. The devices may have hinge assemblies or joints that allow a component of the device, such as a cover unit, to fold over another component of the device, such as a base unit.

BRIEF DESCRIPTION OF THE DRAWINGS

The following detailed description references the drawings, wherein.

DETAILED DESCRIPTION

Figure 1:
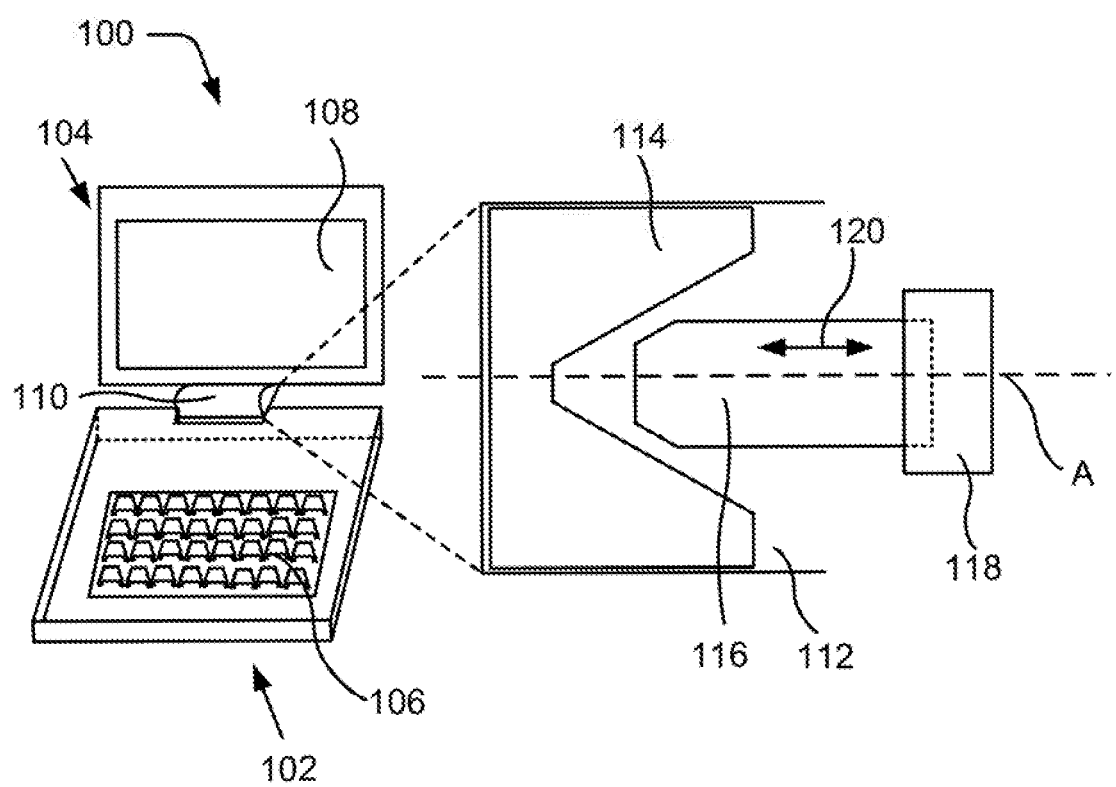
FIG. 1 illustrates a schematic representation of a device with a hinge assembly having a variable operating torque, in accordance with an example.

Electronic devices, such as laptops, smartphones, personal digital assistants (PDAs), or the like, may have foldable components. An electronic device may have a cover unit which houses a display panel for rendering visual content and a base unit to hold a keyboard, memory, and other electronic circuitry. The cover unit may be coupled to the base unit through a hinge assembly.

The hinge assembly may be a single element or may include multiple interconnected elements which may fold and unfold, to enable folding and unfolding of the cover unit with respect to the base unit. The hinge assembly in the electronic devices may have brackets rotatable about a shaft to enable folding and unfolding of the hinge assembly. One bracket may bear the shaft and another bracket may have a groove or a channel adapted to receive the shaft. During folding and unfolding, the shaft of one bracket rotates within the groove of the other bracket. The angle between the base unit and the cover unit may vary in a range of angles between 0 degree to 180 degrees, referred to as an operating range of angles of the hinge assembly.

The force which may be applied to fold or unfold the hinge assembly depends on an operating torque of the hinge assembly. The operating torque of the hinge assembly may be understood as a torque that is to be generated to move the hinge assembly over the operating range of angles. The operating torque of the hinge assembly is generally constant over the operating range of angles, and hence the force which may be applied to move the hinge assembly also remains constant.

In an example, a hinge assembly with a low operating torque may be used to couple the cover unit to the base unit. In such a scenario, the cover unit may be folded and unfolded with respect to the base unit by using less force. This may facilitate a user of a laptop, to conveniently open and close the laptop. However, since the hinge assembly has a low operating torque, the cover unit may get displaced from a particular unfolded position due to its own weight or may get accidentally folded or further unfolded by a user touching the cover unit. Instances of accidental folding and further unfolding of the cover unit may be higher in case of electronic devices having touch-sensitive display panels housed in the cover unit, since, in such cases, the cover unit may be usually subjected to touch forces of the user. Thus, overall stability of the hinge assembly is adversely affected which hinders operation of the electronic device.

Conversely, in another example, a hinge assembly with a high operating torque may be used to couple the cover unit to the base unit. With such a hinge assembly, a high force may be applied to move the cover unit with respect the base unit which may lead to inconvenience of a user to fold and unfold the cover unit.

The present subject matter describes a device in which a cover unit and a base unit are coupled by a hinge assembly, where an operating torque of the hinge assembly can be varied. In an example, the operating torque of the hinge assembly may be varied depending on the movement of the hinge assembly in the operating range of angles. By varying the operating torque of the hinge assembly, the hinge assembly and thus the cover unit can be retained at a particular unfolded position with greater stability and at the same time may be easily operated/moved by the user up to a certain extent in the operating range of angles.

In an example, the device includes a base unit, a cover unit and a hinge assembly that couples the cover unit to the base unit. The hinge assembly is moveable between a folded position and an unfolded position. In an example implementation, the folded position refers to a configuration of the hinge assembly when the angle is 0 degree, between the cover unit and the base unit. In the example implementation, the unfolded position refers to a configuration of the hinge assembly when the angle is above 0 degrees between the cover unit and the base unit. In an example, at a fully unfolded position, the angle between the base unit and the cover unit may be 180 degrees.

The hinge assembly includes a channel, an annular holder disposed in the channel, a shaft engaged with the annular holder, and a hydraulic cylinder coupled to the shaft. The hydraulic cylinder is capable to move the shaft along a longitudinal axis of the shaft, based on a movement of the hinge assembly between the folded position and the unfolded position, to vary an operating torque of the hinge assembly. The operating torque of the hinge assembly may be understood as the torque that is to be generated to move the hinge assembly between the folded position and the unfolded position. A force to be applied on the hinge assembly to move the hinge assembly between the folded position and the unfolded position depends on the operating torque. As the operating torque of the hinge assembly increases, force to be applied to move the hinge assembly also increases.

In an example implementation, when the hinge assembly is moved from the folded towards the unfolded position, the shaft moves in one direction along the longitudinal axis which results in frictional forces between the shaft and the annular holder to increase. Due to increased frictional forces, there is a higher resistance to the movement of the hinge assembly and therefore a greater torque is to be applied to rotate the hinge assembly. Thus, a greater force is to be applied on the hinge assembly to effectuate the movement of the hinge assembly.

In an example implementation, when the hinge assembly is moved from the unfolded to the folded position, the shaft moves in an opposite direction which results in frictional forces between the shaft and the annular holder to decrease. Due to decreased frictional forces, there is a lower resistance to the movement of the hinge assembly and therefore a lower torque is to be applied to move the hinge assembly. Thus, a lesser force is to be applied on the hinge assembly to effectuate the movement of the hinge assembly.

Thus, the linear movement of the shaft in two opposing directions, along the longitudinal axis of the shaft, provides variation in the operating torque of the hinge assembly and thereby varies the force which may be applied to move the hinge assembly. The operating torque of the hinge assembly may be varied depending on direction of movement or position of the hinge assembly. In an example, a device may include a hinge assembly which is movable on application of less force when an angle between the cover unit and the base unit is varied between 0 degrees to 90 degrees. This facilitates a user to easily unfold and fold the cover unit. When an angle between the cover unit and the base unit is varied between 90 degrees to 180 degrees, the hinge assembly may be movable on application of a greater force. Thus, when the cover unit is open at a particular unfolded position, say 100 degrees, the cover unit is retained at the particular unfolded position and is prevented from getting accidentally folded and further unfolded. Further, in cover units with touch-based display panels, the present hinge assembly provides a greater balancing force to withstand touch forces, when the hinge assembly is held at a particular unfolded position, for example, between an angle range of 90 degrees to 180 degrees. Thus, devices of the present subject matter provide greater flexibility in operation along with greater stability of the hinge assembly while opening and closing the cover unit.

The above described implementations are further elaborated with reference to the Figures. The values of the angles mentioned in the described implementations refers to the angle between the cover unit and the base unit of the device. It should be noted that the description and figures merely illustrate the principles of the present subject matter along with examples described herein and, should not be construed as a limitation to the present subject matter. It is thus noted that various arrangements may be devised that, although not explicitly described or shown herein, describe the principles of the present subject matter. Moreover, all statements herein reciting principles, aspects, and examples of the present subject matter, as well as specific examples thereof, are intended to encompass equivalents thereof.

FIG. 1 illustrates a schematic representation of a device 100 with a hinge assembly 110 having a variable operating torque, in accordance with an example. In an example implementation, the device 100 may be an electronic device, such as a laptop, a foldable tablet, a personal digital assistant (PDA), a foldable e-reader, or the like. The device 100 includes a base unit 102 and a cover unit 104. In an example implementation, the base unit 102 houses a keyboard 106 and other electronic components of the device 100. The cover unit 104 houses a display panel 108 for rendering visual content. In an example implementation, the display panel 108 may be a touch-based display panel capable of receiving touch-based user inputs.

The device 100 includes a hinge assembly 110 to couple to the cover unit 104 to the base unit 102. The hinge assembly 110 may be connected between the cover unit 104 and the base unit 102 through screws. In an example implementation, the hinge assembly 110 may be positioned within a hinge cap (not shown) that covers the hinge assembly 110. In an example implementation, the hinge assembly 110 is formed from stainless steel. The hinge assembly 100 is moveable between a folded position and an unfolded position to enable movement of the cover unit 104 with respect to the base unit 102. In an example implementation, the folded position refers to a configuration of the hinge assembly 100 when the angle is 0 degree between the cover unit 104 and the base unit 102. In an example implementation, the unfolded position refers to a configuration of the hinge assembly 100 when the angle is above 0 degree, between the cover unit 104 and the base unit 102.

A cross-sectional representation of the hinge assembly 110 is illustrated in FIG. 1. The hinge assembly 110 includes a channel 112. In an example implementation, the channel 112 is a slot or groove formed within the hinge assembly 110. The hinge assembly 110 includes an annular holder 114 disposed in the channel 112. In an example, an annular holder is an element adapted to receive a shaft of the hinge assembly. In some examples, an annular holder may have a variable cross-sectional diameter. In an example implementation, the annular holder 114 may be snug-fitted in the channel 112.

The hinge assembly 110 further includes a shaft 116 engaged with the annular holder 114 in such a manner that the shaft 116 is retained within the annular holder 114. In an example, a shaft may be a rotatable element that enables a movement of the hinge assembly between the folded position and the unfolded position. In an example, a shaft is a rod-shaped element that may rotate about its longitudinal axis. In some examples, a shaft may have a variable cross-sectional diameter. A portion of the shaft 116, depicted by the dotted lines in FIG. 1, may reside within the hydraulic cylinder 118.

The hinge assembly 110 further includes a hydraulic cylinder 118. In an example, a hydraulic cylinder may store a fluid to control a movement of the shaft along the longitudinal axis A based on hydraulic pressure of the fluid. In an example, the shaft 116 and the hydraulic cylinder 118 may be coupled to an element (not shown) of the hinge assembly which in turn may be coupled to the cover unit 104. In an example, the annular holder 114 may be disposed in the channel 112 formed on another element (not shown) of the hinge assembly which in turn may be coupled to the base unit 102. When the cover unit 104 is moved with respect to the base unit 102, the shaft 116 may rotate about a longitudinal axis A of the shaft 116 thereby enabling a movement of the hinge assembly 110 between the folded position and the unfolded position.

The hydraulic cylinder 118 is coupled to the shaft 116 and can control linear movement of the shaft 116 in a direction 120 along the longitudinal axis A of the shaft 116. The hydraulic cylinder is to move the shaft along the longitudinal axis A, based on a movement of the hinge assembly 110 between the folded position and the unfolded position, to vary an operating torque of the hinge assembly 110. With variation in the operating torque, the force to move the hinge assembly 100 between the folded and the unfolded position also varies. Thus, the device 100 has increased operational flexibility as well as enhanced stability when the cover unit 104 is folded or unfolded with respect to the base unit 102.

Figure 2:
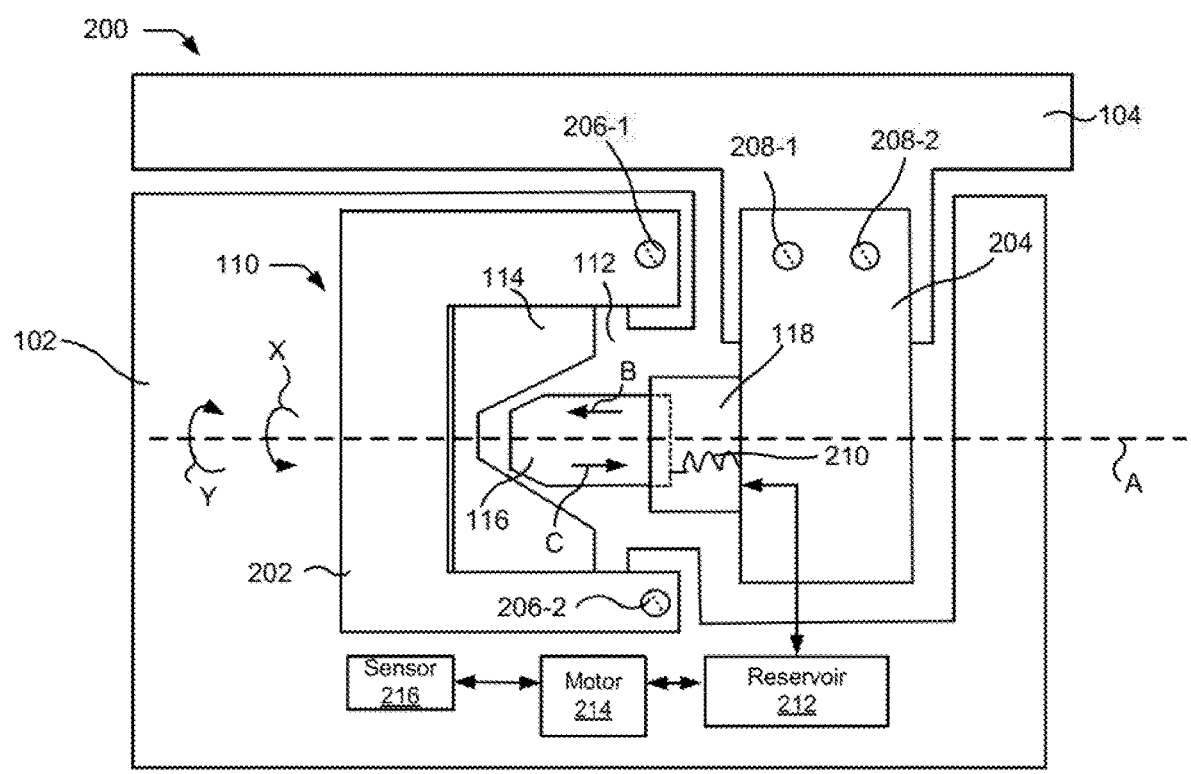
FIG. 2 illustrates a schematic representation of a device with a hinge assembly having a variable operating torque, in accordance with an example.

FIG. 2 illustrates a schematic representation of a device 200 with a hinge assembly 110 having a variable operating torque, in accordance with an example. The device 200 includes the base unit 102, the cover unit 104, and the hinge assembly 110 which couples the base unit 102 to the cover unit 104. The hinge assembly 110 includes a first hinge element 202 and a second hinge element 204. In an example, a first hinge element may be a component of the hinge assembly which may be coupled to a base unit of the device and a second hinge element may be a component of the hinge assembly which may be coupled to a cover unit of the device. In an example, a second hinge element may be rotated with respect to a first hinge element to enable folding and unfolding of the hinge assembly. In some examples, the first hinge element and the second hinge element may be brackets which support other components of the hinge assembly. With reference to FIG. 2, the first hinge element 202 has two holes 206-1 and 206-2. The first hinge element 202 is coupled to the base unit 102, by screws passing through the holes 206-1 and 206-2.

As shown in FIG. 2, the first hinge element 202 includes the channel 112. The channel 112 may have a uniform cross-sectional area. The hinge assembly 110 also includes the annular holder 114 disposed in the channel 112. The annular holder 114 has an inner diameter D at one end of the annular holder 114. The inner diameter of the annular holder 114 decreases gradually towards the other end of the annular holder 114.

The second hinge element 204 has two holes 208-1 and 208-2. The second hinge element 204 is coupled to the cover unit 104, by screws passing through the holes 208-1 and 208-2. In an example implementation, the first hinge element 202 and the second hinge element 204 are formed from stainless steel.

The second hinge element 204 includes the shaft 116. The shaft 116 has a tapering end facing towards the first hinge element 202. The shaft 116 is engaged with the annular holder 114 in such a manner that the shaft 116 is retained within the annular holder 114. The shaft 116 is rotatable about a longitudinal axis A to enable a movement of the hinge assembly 110 between a folded position and an unfolded position. The second hinge element 204 further includes the hydraulic cylinder 118. The hydraulic cylinder 118 is coupled to the shaft 116 in such a manner that a portion of the shaft 116, depicted by the dotted lines in FIG. 2, resides inside the hydraulic cylinder 118. The hydraulic cylinder 118 can control movement of the shaft 116 along the longitudinal axis A of the shaft 116.

In response to the hinge assembly 110 being moved from the folded position towards the unfolded position, the hydraulic cylinder 118 moves the shaft 116 inside the annular holder 114, in a first direction, as depicted by arrow B, along the longitudinal axis A of the shaft 116 to increase an operating torque of the hinge assembly 110. In an example implementation, the hydraulic cylinder 118 may move the shaft 116 in the first direction, to increase the operating torque of the hinge assembly 110, when the cover unit 104, is moved beyond a threshold angle with respect to the base unit 102. In an example, the threshold angle may be 90 degrees.

In response to the hinge assembly 110 being moved from the unfolded position towards the folded position, the hydraulic cylinder 118 moves the shaft 116 in a second direction, opposite to the first direction, as depicted by arrow C, to reduce the operating torque. In an example implementation, the hydraulic cylinder 118 may move the shaft 116 in the second direction, to reduce the operating torque, when the cover unit 104 is moved below the threshold angle with respect to the base unit.

The hinge assembly 110 further includes a biasing element 210. In an example implementation, the biasing element 210 is a spring formed from metal. The biasing element 210 has one end coupled to the hydraulic cylinder 118. In an example implementation, an end of the biasing element 210 may be secured to an end of the hydraulic cylinder 118 by an adhesive. The other end of the biasing element 210 is coupled to the shaft 116. In an example implementation, the other end of the biasing element 210 may be secured to an end of the shaft 116 by an adhesive.

The device 100 further includes a reservoir 212, a motor 214, and a sensor 216, as shown in FIG. 2, to enable operation of the hinge assembly 110. In an example implementation, the reservoir 212, the motor 214, and the sensor 216 may be housed within the base unit 102. As shown in FIG. 2, the hydraulic cylinder 118 is coupled to the reservoir 212. Both the reservoir 212 and the hydraulic cylinder 118 is capable of storing a fluid, such as oil. In an example implementation, the hydraulic cylinder 118 is connected to the reservoir 212 through a pipe to carry the fluid between the hydraulic cylinder 118 and the reservoir 212. The motor 214 is coupled to the reservoir 212 to drive the fluid between the reservoir 212 and the hydraulic cylinder 118. In an example implementation, the motor 214 is a servomotor. In an example, a driveshaft (not shown) of the motor 214 rotates in one direction to transfer the fluid from the reservoir 212 to the hydraulic cylinder 118, in response to the hinge assembly 110 being moved from the folded position towards the unfolded position, to increase hydraulic pressure of the fluid in the hydraulic cylinder 118. In another example, the driveshaft (not shown) of the motor 214 rotates in an opposite direction to transfer the fluid from the hydraulic cylinder 118 to the reservoir 212, in response to the hinge assembly 110 being moved from the unfolded position towards the folded position, to decrease hydraulic pressure of the fluid in the hydraulic cylinder 118.

The operation of the motor 214 is controlled by the sensor 216. The sensor 216 may send control signals to the motor 214 to activate the motor 214. In an example implementation, the sensor 216 is a magnetic angle sensor which can detect an angle between the cover unit 104 and the base unit 102 coupled by the hinge assembly 110. Based on the detected angle, the sensor 216 activates the motor 214 to drive the fluid between the reservoir 212 and the hydraulic cylinder 118.

With reference to FIG. 2, consider that the hinge assembly 200 is at a folded position, such that the angle between the cover unit and the base unit is 0 degree. At this stage, the biasing element 210 remains in a neutral unbiased state. To move the hinge assembly 110 from the folded position towards an unfolded position, the cover unit 104 is lifted from the base unit 102. The second hinge element 204 along with the shaft 116 rotates in a direction, depicted by arrow X.

As the cover unit 104 is lifted from the base unit 102, the angle between the cover unit 104 and the base unit 102 gradually increases. The sensor 216 can detect the angle. In an example implementation, the sensor 216 may compare successive readings of the angle to determine that the angle between the cover unit 104 and the base unit 102 is increasing. Based on the determination, the sensor 216 identifies that the hinge assembly 110 is moved from the folded position towards the unfolded position. In another example implementation, as the cover unit 104 is lifted from the base unit 102, the sensor 224 can detect whether the cover unit 104 is moved beyond the threshold angle with respect to the base unit 102. In an example implementation, the threshold angle may be predefined, say 90 degrees.

On identifying that the hinge assembly 110 is being moved from the folded towards the unfolded position or on detecting that the cover unit 104 is moved beyond the threshold angle with respect to the base unit 102, the sensor 216 sends a control signal to activate the motor 214 to drive the fluid from the reservoir 212 to the hydraulic cylinder 118. In an example implementation, the motor 214 may generate a high pressure in the reservoir 212 and thereby drive the fluid from the reservoir 212 to the hydraulic cylinder 118 which is at a lower pressure. With the fluid entering the hydraulic cylinder 118, hydraulic pressure in the hydraulic cylinder 118 increases. The fluid in the hydraulic cylinder 118 thrusts the shaft 116 to move in the first direction, depicted by arrow B, along the longitudinal axis A of the shaft 116. As the shaft 116 moves in the first direction, the biasing element 210 is stretched and thereby gets biased.

As the shaft 116 moves in the first direction, an interfacing area between the shaft 116 and the annular holder 114 increases. The increase in the interfacing area increases frictional force between the annular holder 114 and the shaft 116, when the shaft 116 rotates in the direction indicated by the arrow X. The frictional force opposes the movement of the hinge assembly 110, thereby increasing the operating torque of the hinge assembly 110. Thus, more force is to be applied to move the hinge assembly 110 towards the unfolded position.

While the hinge assembly 110 is gradually moved from the folded towards the unfolded position, more and more fluid is driven to the hydraulic cylinder 118, a greater force acts on the shaft 116 which moves the shaft 116 further in the first direction and thereby the operating torque further increases.

The hinge assembly 110 may reach an unfolded position where the angle between the cover unit 104 and the base unit 102 is 180 degrees. In an example, the angle may be less than 180 degrees and more that 90 degrees. In another example, the angle may be more than 180 degrees. At this stage, the biasing element 210 remains in a fully biased stretched state. Say, the hinge assembly 110 is to be moved towards the folded position. To move the hinge assembly 110 from the unfolded position towards the folded position, the cover unit 104 is pushed to overlay on the base unit 102. The second hinge element 204 along with the shaft 116 rotates, in a direction, depicted by arrow Y.

As the cover unit 104 is pushed towards the base unit 102, the angle between the cover unit 104 and the base unit 102 gradually decreases. The sensor 216 can detect the angle. In an example implementation, the sensor 216 may compare successive readings of the angle to determine that the angle between the cover unit 104 and the base unit 102 is decreasing. Based on the determination, the sensor 216 identifies that the hinge assembly 110 is moved from the unfolded position towards the folded position. Further, in an example implementation, the sensor 216 can detect when the cover unit 104 is moved below the threshold angle with respect to the base unit 102.

On identifying that the hinge assembly 110 is being moved from the unfolded towards the folded position or on detecting that the cover unit 104 is moved below the threshold angle, the sensor 216 sends a control signal to activate the motor 214 to drive the fluid from the hydraulic cylinder 118 to the reservoir 212. In an example implementation, the motor 214 may generate a low pressure/vacuum in the reservoir 212 and thereby drive the fluid from the hydraulic cylinder 118 to the reservoir 212. With the fluid exiting the hydraulic cylinder 118, hydraulic pressure in the hydraulic cylinder 118 decreases which unbiases the biasing element 210 that tries to return to its neutral state, thereby moving the shaft 116 in the second direction, depicted by arrow C.

As the shaft 116 moves in the second direction, an interfacing area between the shaft 116 and the annular holder 114 decreases, which results in lowering of the frictional force between the annular holder 114 and the shaft 116, when the shaft 116 rotates during folding. Since, the frictional force opposing the movement of the hinge assembly 110 reduces, the operating torque of the hinge assembly 110 reduces. Thus, less force is to be applied to move the hinge assembly 110 towards the folded position.

Therefore, while the hinge assembly 110 is gradually moved from the unfolded towards the folded position, more and more fluid is driven from the hydraulic cylinder 118 to the reservoir 212, the hydraulic pressure in the hydraulic cylinder 118 reduces which allows the biasing element 210 to unbias and move the shaft 116 further in the second direction and thereby the operating torque further decreases. Thus, in response to the hinge assembly 110 being moved between the folded position and the unfolded position, the hydraulic pressure of the fluid in the hydraulic cylinder 118 is varied to move the shaft 116, linearly, along the longitudinal axis A thereby varying the operating torque of the hinge assembly 110.

Figure 3:
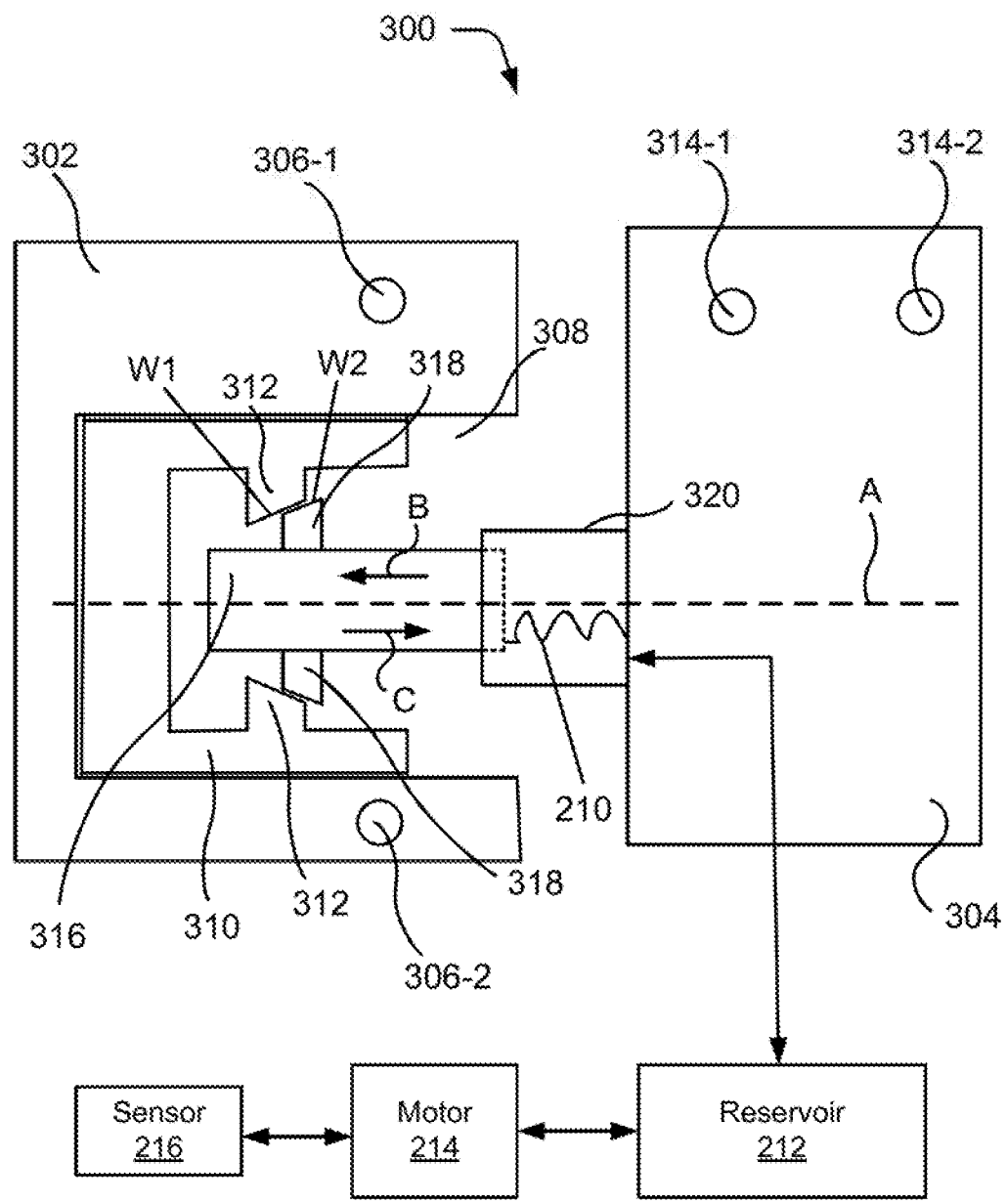
FIG. 3 illustrates a schematic representation of a hinge assembly having a variable operating torque, in accordance with an example.

FIG. 3 illustrates a schematic representation of a hinge assembly 300 having a variable operating torque, in accordance with an example. In an example implementation, the hinge assembly 300 may be included in a device, such as the device 100, and can couple a base unit of the device, such as the base unit 102 of the device 100, to a cover unit of the device, such as the cover unit 104 of the device 100. The cover unit may be understood as a portion of the laptop that houses a display panel for rendering visual display. The hinge assembly 300 has a first hinge element 302 and a second hinge element 304.

The first hinge element 302 has holes 306-1 and 306-2 for coupling the first hinge element 302 to a cover unit of a laptop by screws. The first hinge element 302 has a channel 308. The channel 308 is an annular slot within the first hinge element 302. The hinge assembly 300 includes an annular holder 310 disposed in the channel 308, in such a manner that walls of the annular holder 310 interface with walls of the channel 308. In an example implementation, the annular holder 310 may be snug-fitted in the channel 308. The annular holder 310 has a first annular flange 312. The first annular flange 312 is a ring-shaped projection extending from an inner wall of the annular holder 310. The first annular flange 312 has a surface with a wedge-shaped profile, depicted as W1. The annular flange 312 has an inner diameter which reduces along the wedge-shaped profile W1.

The second hinge element 304 bears holes 314-1 and 314-2 for passage of screws which couple the second hinge element 304 to a base unit of a laptop through screws. The base unit may be understood as a portion of the laptop that houses a keyboard, memory, and other electronic components of the laptop.

The second hinge element 304 includes a shaft 316. The shaft 316 is engaged with the annular holder 310 in such a manner that the shaft 316 is held in the annular holder 310. The shaft 316 is rotatable about a longitudinal axis A to move the hinge assembly 300 between a folded position and an unfolded position.

The shaft 316 includes a second annular flange 318. The second annular flange 318 is a ring-shaped projection extending from an outer wall of the shaft 316 and projecting towards the annular holder 310. The second annular flange 318 has a wedge-shaped profile, depicted as W2, at its surface facing towards the annular holder 310. As shown in FIG. 3, the second annular flange 318 interfaces with the first annular flange 312. A surface of the first annular flange 312 with the wedge-shaped profile W1 interacts with a surface of the second annular flange 318 with the wedge-shaped profile W2. The interaction between these two surfaces of the first and second annular flanges 312 and 318 develops a frictional force, when the shaft 316 rotates to fold/unfold the hinge assembly 300. The frictional force depends on an interfacing area between the first and second annular flanges 312 and 318. The interfacing area may be understood as a total area of contact between the first and second annular flanges 312 and 318.

When the shaft 316 is moved in a first direction, depicted by arrow B, the interfacing area between the first annular flange 312 and the second annular flange 318 increases. The increase in the interfacing area generates greater frictional force between the flanges which results in an increase of the operating torque of the hinge assembly 300. When the shaft 316 is moved in a second direction, depicted by arrow C, the interfacing area between the first annular flange 312 and the second annular flange 318 is decreased. The decrease in the interfacing area generates comparatively lesser frictional force between the flanges which results in a decrease of the operating torque of the hinge assembly 300.

Although in FIG. 3 the annular holder 310 is shown to have a single annular flange, in an example implementation, multiple annular flanges similar to the first annular flange 312 may be formed along the length of the annular holder 310. Likewise, multiple annular flanges similar to the second annular flange 318 may be formed along the length of the shaft 316. In the example implementation, each of the multiple flanges similar to the first annular flange 312 formed on the annular holder 310, interface with a corresponding annular flange formed on the shaft 316. Thus, as the shaft 316 is moved in the first direction, the frictional force between each pair of interfacing flanges increase thereby increasing the operating torque of the hinge assembly 300. Thus, as the shaft 316 moves in the first direction more force is to be applied to move the hinge assembly 300. Similarly, as the shaft 316 is moved in the second direction, the frictional force between each pair of interfacing flanges decrease thereby decreasing the operating torque of the hinge assembly 300. Thus, as the shaft 316 moves in the second direction less force is to be applied to move the hinge assembly 300.

The second hinge element 304 further includes a hydraulic cylinder 320 similar to the hydraulic cylinder 118. The hydraulic cylinder 320 is coupled to the reservoir 212. The interconnections between the hydraulic cylinder 320, the reservoir 212, the motor 214, and the sensor 216 and their respective operations are similar to that elaborated in the description of FIG. 2. Further, the hinge assembly 300 is operated in a similar manner as the operation of the hinge assembly 110, described with reference to FIGS. 1 and 2.

Figure 4:
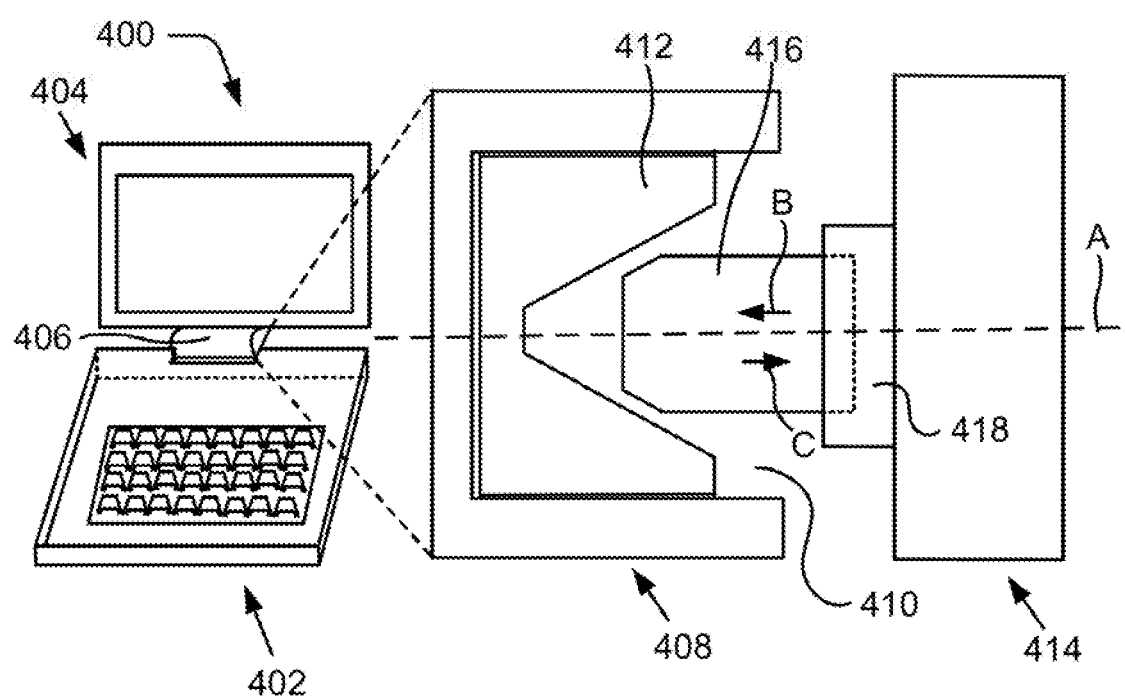
FIG. 4 illustrates a schematic representation of a device with a hinge assembly having a variable operating torque, in accordance with an example.

FIG. 4 illustrates a schematic representation of a device 400 with a hinge assembly 406 having a variable operating torque, in accordance with an example. In an example implementation, the device 400 includes a base unit 402 and a cover unit 404. In an example implementation, the base unit and the cover unit 402 and 404 are similar to the base unit and cover unit, 102 and 104, respectively.

The device 400 includes a hinge assembly 406 to couple to the cover unit 404 to the base unit 402. The hinge assembly 406 includes a first hinge element 408 having a channel 410 which is similar to the first hinge element 202 with the channel 112, as illustrated in FIG. 2. The hinge assembly 406 further includes an annular holder 412 disposed in the channel 410. The annular holder 412 is similar to the annular holder 114.

The hinge assembly 406 includes a second hinge element 414. The second hinge element 414 includes a shaft 416 engaged with the annular holder 412. The second hinge element 414 is similar to the second hinge element 204 of FIG. 2 and the shaft 416 is similar to the shaft 116. The shaft 416 is rotatable about a longitudinal axis A to move the hinge assembly 406 between a folded position and an unfolded position.

The second hinge element 414 further includes a hydraulic cylinder 418 coupled to the shaft 416. The hydraulic cylinder 418 is similar to the hydraulic cylinder 118. When the hinge assembly 406 is moved from the folded position towards the unfolded position, the hydraulic cylinder 418 moves the shaft 416 in a first direction, as depicted by arrow B, along the longitudinal axis A of the shaft 416, to increase an operating torque of the hinge assembly 406. When the hinge assembly 406 is moved from the unfolded position towards the folded position, the hydraulic cylinder 418 moves the shaft 416 in a second direction, as depicted by arrow C, opposite to the first direction, to reduce the operating torque. The operation of the hinge assembly 406 is similar to the operation of the hinge assembly 100, described with reference to FIGS. 1 and 2.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A device comprising:
   a base unit;
   a cover unit; and
   a hinge assembly to couple the cover unit to the base unit, the hinge assembly being moveable between a folded position and an unfolded position, the hinge assembly comprising:
      a channel;
      an annular holder disposed in the channel;
      a shaft engaged with the annular holder;
      a hydraulic cylinder coupled to the shaft, wherein the hydraulic cylinder is to move the shaft along a longitudinal axis of the shaft, based on a movement of the hinge assembly between the folded position and the unfolded position,
      a reservoir storing a fluid, the reservoir being coupled to the hydraulic cylinder; and
      a motor coupled to the reservoir to drive the fluid between the reservoir and the hydraulic cylinder.

2. The device as claimed in claim 1, wherein the hydraulic cylinder is to:
   move the shaft in a first direction along the longitudinal axis, in response to the hinge assembly being moved from the folded position towards the unfolded position, to increase an operating torque; and
   move the shaft in a second direction, opposite to the first direction, in response to the hinge assembly being moved from the unfolded position towards the folded position, to reduce the operating torque.

3. The device as claimed in claim 2, wherein the annular holder includes a first annular flange, and the shaft includes a second annular flange interfacing with the first annular flange, Wherein a movement of the shaft: towards the first direction is to increase an interfacing area between the first annular flange and the second annular flange.

4. The device as claimed in claim 3, wherein a movement of the shaft towards the second direction is to decease the interfacing area between the first annular flange and the second annular flange.

5. The device as claimed in claim 1, wherein the hinge assembly further comprises a biasing element, one end of the biasing element being coupled to the hydraulic cylinder and other end of the biasing element being coupled to the shaft, wherein,
- a movement of the shaft towards a first direction is to bias the biasing element; and
- a decrease in hydraulic pressure in the hydraulic cylinder is to unbias the biasing element.

6. The device as claimed in claim 1, wherein
- in response to the hinge assembly being moved from the folded position towards the unfolded position, the motor is to drive the fluid from the reservoir to the hydraulic cylinder to increase a hydraulic pressure in the hydraulic cylinder; and
- in response to the hinge assembly being moved from the unfolded position towards the folded position, the motor is to drive the fluid from the hydraulic cylinder to the reservoir to decrease the hydraulic pressure in the hydraulic cylinder.

7. The device as claimed in claim 6, further comprising a sensor coupled to the motor, the sensor to detect an angle between the base unit and the cover unit, wherein the sensor is to activate the motor based on the detected angle, to drive the fluid between the reservoir and the hydraulic cylinder.

8. The device as claimed in claim 1, wherein, in response to the hinge assembly being moved between the folded position and the unfolded position, hydraulic pressure in the hydraulic cylinder is varied to move the shaft along the longitudinal axis.

9. A device comprising:
- a base unit;
- a cover unit; and
- a hinge assembly to couple the cover unit to the base unit, the hinge assembly comprising:
  - a first hinge element having a channel coupled to the base unit;
  - an annular holder disposed in the channel;
  - a second hinge element coupled to the cover unit, comprising:
    - a shaft engaged with the annular holder, the shaft being rotatable about a longitudinal axis of the shaft, to move the hinge assembly between a folded position and an unfolded position; and
    - a hydraulic cylinder coupled to the shaft;
  - a reservoir storing a fluid, the reservoir being coupled to the hydraulic cylinder; and
  - a motor coupled to the reservoir to drive the fluid between the reservoir and the hydraulic cylinder.

10. The device as claimed in claim 9, wherein the annular holder includes a first annular flange, and the shaft includes a second annular flange interfacing with the first annular flange, Wherein a movement of the shaft towards a first direction is to increase an interfacing area between the first annular flange and the second annular flange.

11. The device as claimed in claim 10, wherein a movement of the shaft towards a second direction is to decrease the interfacing area between the first annular flange and the second annular flange.

12. The device as claimed in claim 9, wherein the hinge assembly further comprises:
- a biasing element, one end of the biasing element being coupled to the hydraulic cylinder and other end of the biasing element being coupled to the shaft, wherein,
- a movement of the shaft towards a first direction is to bias the biasing element; and
- a decrease in hydraulic pressure of the hydraulic cylinder is to unbias the biasing element.

13. A device comprising:
- a base unit;
- a cover unit;
- a hinge assembly to couple the cover unit to the base unit, the hinge assembly comprising:
  - a channel;
  - an annular holder disposed in the channel;
  - a shaft engaged with the annular holder; and
  - a hydraulic cylinder coupled to the shaft, wherein the hydraulic cylinder is to:
    - move the shaft in a first direction along a longitudinal axis of the shaft, in response to the cover unit being moved beyond a threshold angle with respect to the base unit, to increase an operating torque of the hinge assembly; and
    - move the shaft in a second direction, opposite to the first direction, in response to the cover unit being moved below the threshold angle with respect to the base unit, to reduce the operating torque,
  - a reservoir storing a fluid, the reservoir being coupled to the hydraulic cylinder; and
  - a motor coupled to the reservoir to drive the fluid between the reservoir and the hydraulic cylinder.

14. The device as claimed in claim 13, wherein the annular holder includes a first annular flange, and the shaft includes a second annular flange interfacing with the first annular flange, wherein a movement of the shaft towards the first direction is to increase an interfacing area between the first annular flange and the second annular flange.

15. The device as claimed in claim 14, wherein a movement of the shaft towards the second direction is to decrease the interfacing area between the first annular flange and the second annular flange.

* * * * *